Aug. 12, 1969  R. M. HAGEN  3,460,740
HEAT-SEALABLE CUSHIONING AND INSULATING STRUCTURES
Filed Dec. 22, 1967

INVENTOR
RICHARD M. HAGEN

BY

ATTORNEY

United States Patent Office

3,460,740
Patented Aug. 12, 1969

3,460,740
HEAT-SEALABLE CUSHIONING AND INSULATING STRUCTURES
Richard M. Hagen, Wilmington, Del., assignor to E. I. du Pont de Nemours and Company, Wilmington, Del., a corporation of Delaware
Filed Dec. 22, 1967, Ser. No. 692,901
Int. Cl. B65d *31/00, 27/10;* B29d *27/00*
U.S. Cl. 229—53                                    9 Claims

ABSTRACT OF THE DISCLOSURE

Bags and envelopes composed entirely of thermoplastic polymers, the walls thereof containing at least one layer each of a closed cell foam and an unexpanded film joined along the edges by heat-seal seams.

BACKGROUND OF THE INVENTION

This invention relates to cushioning and insulating structures and more particularly it relates to bags, envelopes or sleeves the walls of which comprise at least one layer of closed cell thermoplastic polymeric foam and at least one layer of unexpanded, thermoplastic, polymeric film.

Bags and envelopes of the type intended are those commonly used for protecting delicate assemblies and bottles during mailing or shipping and for transporting either hot or cold comestibles. Known cushioning and insulating bags or sleeves are essentially paper bags, each wall of which can be multi-ply paper sheets or of paper sheets enclosing creped wadding or fibrous filler. As is well known, each wall can also contain a layer of highly reflecting, metallic sheet to improve the thermal insulation properties. Although paper is itself inexpensive, known construction imparting cushioning and insulating properties to bags and envelopes are rather costly to produce. Since paper is neither waterproof nor greaseproof, paper-based products suffer from these deficiencies. Also associated with those products is dust resulting from the cutting or abrasion of paper or from the use of dusty fillings. Not only does this dust detract from visual aesthetics, but it also can render the products completely unsuitable for certain uses. Still further, appreciable cushioning and insulating properties in known products apparently result only when they are relatively thick and bulky.

SUMMARY OF THE INVENTION

According to the present invention there is provided an envelope having at least 2 walls, each wall of the envelope being composed of at least one layer of a closed cell, foamed, thermoplastic polymer overlaid with and joined along the edges of each open end of the envelope to at least one layer of a film of unexpanded thermoplastic polymer by a heat-seal seam, the adjacent walls of the envelope and their corresponding foamed and film layers being joined together at their edges along the whole length of the envelope by heat-seal seams and each layer of the foamed thermoplastic polymer being substantially homogeneously foamed throughout with small polyhedral-shaped cells completely enclosed within thin film-like cell-walls and gas-inflated such that each layer of foam has a density between about 0.005 and 0.5 gm./cc.

The bags and envelopes of this invention are composed entirely of thermoplastic polymer. They are, thus, waterproof, greaseproof, and free from dusting. They provide, moreover, excellent cushioning and insulating properties at low weights and with relatively low bulk. Still further their open ends can be closed by standard and convenient heat-sealing apparatus as well as by the methods commonly used for closing paper bags.

The invention will be described in detail by reference to the drawings.

DESCRIPTION OF THE PREFERRED EMBODIMENT

Figure 1:
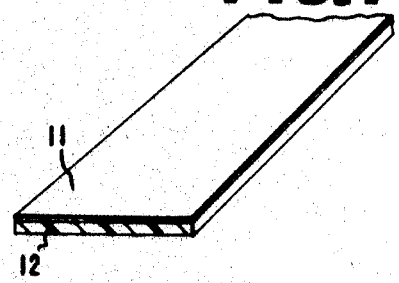
FIGURE 1 represents a sheet of foamed thermoplastic polymer overlaid with a sheet of film.

The products of this invention are best visualized in terms of a method by which they can be formed. Thus, FIGURE 1 illustrates a first step in which an unexpanded thermoplastic film 11 is overlaid on a sheet of closed-cell foam 12 as more completely described hereinafter. These two sheets are joined into a laminate 20, FIGURE 2, by providing heat-seal seams 21 along their edges. Well-known incremental or continuous heat-sealing is employed.

Figure 3:
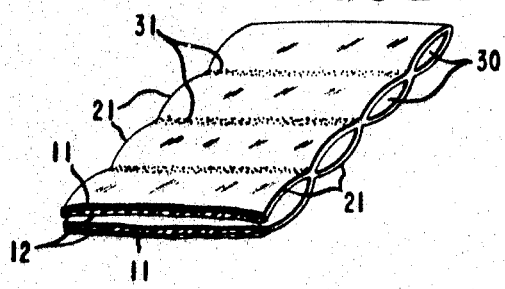
FIGURE 3 shows two of the laminates of FIGURE 2 overlaid and heat-sealed together along spaced seams perpendicular to the original heat-seal seams, said second set of heat-seal seams being scored so that individual sleeves may readily be torn from the continuous product.

Cushioning and insulating envelopes or sleeves 30 of FIGURE 3 are formed when two laminates 20 are overlaid and joined by spaced heat-seal seams 31 extending across the width of superimposed laminates 20 and generally perpendicular to the original heat-sealed seams 21. Severing the product along each heat-seal seam 31 concurrently with heat sealing provides individual separate sleeves 30. Alternatively, heat-seal seams 31 can be scored to provide interconnected sleeves 30 from which separated sleeves 30 can later be torn as needed. Heat-seal seams 31 can be curved, formed at varying spacings, or formed at various angles to the original heat-seal seams 21, thus resulting in sleeves 30 of varying sizes and shapes.

Figure 2:
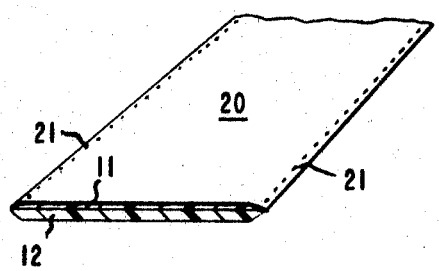
FIGURE 2 shows the sheets attached as a laminate by heat-seal seams formed continuously along the whole length of both their edges.
Figure 4:
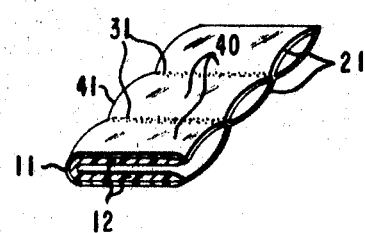
FIGURE 4 shows bags formed by folding the laminate of FIGURE 2 midway along its length and providing heat-sealed and scored seams as in FIGURE 3.

Similarly, bags 40 result if the edge-bonded laminate 20 of FIGURE 2 is folded along a line 41 parallel to heat-sealed seams 21 so that the two seams 21 are superimposed and if heat-seal seams 31 are likewise formed at spaced intervals as shown in FIGURE 4. Again, individual bags 40 are separately formed by severing the product along heat-seal seams 31; or the heat-seal seams 31 can be scored for later separation of individual bags 40 from the continuous product.

Figure 5:
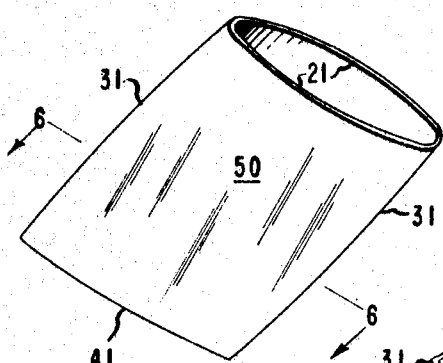
FIGURE 5 is an enlarged view of a single bag according to this invention.

For clarity, FIGURE 5 shows on a larger scale a single insulating and cushioning bag 50 according to this invention. The original heat-seal seams 21, as formed in the intermediate product 20 of FIGURE 2, form the edges of the open top. Bottom 41 is simply the fold-line resulting when laminate 20 is folded to double thickness. The two thicknesses are joined along the sides of the bag by second heat-seal seams 31.

Figure 6:
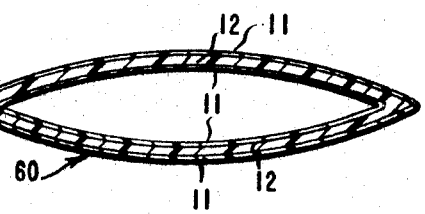
FIGURE 6 is the cross-section indicated at 6—6 of FIGURE 5 showing one alternative construction of the laminate of FIGURE 2.

Cross-section 60 of FIGURE 6, taken as indicated at 6—6 of FIGURE 5, shows an alternative construction of each wall wherein two layers of thermoplastic film 11 enclose one layer of thermoplastic foam sheet 12. The number of and order in which film and foam layers occur in each wall can be selected as desired. Multiple foam-sheet layers 12 can be used to provide increased thermal insulation, cushioning properties and/or bulk.

Any unexpanded thermoplastic film which is heat-sealable is suitable for the purposes of the present invention.

Particularly preferred, because of flexibility, toughness, low cost, and compatibility with foamed sheets, are polyethylene or polypropylene films. They are generally provided in thicknesses ranging between about 0.5 and 5.0 mils (0.0127 and 0.127 mm.). They can be embossed, colored, or otherwise decorated according to the use intended.

Preferred foamed thermoplastic sheets for use in this invention are comprised either of stereo-regular polypropylene or of linear, high-density polyethylene. They can be prepared directly in sheet-form according to the extrusion processes disclosed in Blades and White, U.S. Patent No. 3,227,784, and in the application of Parrish, Ser. No. 664,781, filed Aug. 31, 1967. The former yields ultramicrocellular products substantially homogeneously composed of polyhedral-shaped cells having maximum transverse dimensions less than about 1000 microns wherein at least a majority of the cells are of the closed variety, being completely enclosed by film-like cell-walls less than about 2 microns thick. On the other hand the process of the above application results in a microcellular, larger cell sized, higher tear strength product, still retaining, however, such characteristics of the ultramicrocellular product as closed polyhedral cells, crystallinity, etc. The foam-cells are gas-inflated to provide a density for the sheet of from about 0.005 gm./cc. to about 0.5 gm./cc. and preferably a density of from about 0.005 gm./cc. to about 0.03 gm./cc.

The thickness of a suitable foamed sheet measured normal to its surface, is less than about 0.125 inch (0.32 cm.) and ordinarily less than or about 0.06 inch (0.15 cm.). Frequently these foamed sheets have a creped appearance resulting from longitudinal corrugation during extrusion. If the corrugations are allowed to remain, the effective space-filling thickness of each sheet can be two or more times as great as those thicknesses specified above.

The disclosure of the above referred to patent and application, as well as that of Blades and White, U.S. Patent 3,227,664 further describing the type of foam products suitable for the purposes of this invention, are incorporated herein by reference.

It is essential that at least a majority of the foam-cells be closed. Otherwise they can neither confine nor be inflated by the gases from which the outstanding cushioning properties of these envelopes derive. Determination of closed-cell content is ordinarily by visual or microscopic examination. A satisfactory closed-cell content is indicated if a sample, on being firmly squeezed between two fingers, feels pneumatic and regains substantially its original thickness on release of compression. Otherwise, a gas-displacement method may be employed such as that described by Remington and Pariser in Rubber World, May 1958, page 261, modified to operate at the lowest possible pressure differentials in order to avoid distortion of the foam.

Gas-inflation of the foamed sheets is accomplished by introducing within the closed cells a normally gaseous material which permeates the cell-walls more slowly than air. This condition creates an osmotic gradient within the cells for the inward permeation of air; and equilibration in air results in gas-inflation to the low densities specified. By adding a slowly diffusing normally gaseous material, e.g., dichlorotetrafluoroethane, to the foamable composition before extrusion, some gets trapped within the closed cells of the extruded sheet to provide the necessary osmotic gradient and to guarantee inflation in air. Otherwise, the extruded sheet collapses by wrinkling and folding of its solidified cell-walls, and it must be reinflated. Reinflation results upon immersing the previously foamed sheet in a volatile plasticizing fluid, e.g., trichlorofluoromethane or methylene chloride, and then, while still wet with plasticizing fluid, exposing the sheet to the slowly diffusing material, e.g., dichlorotetrafluoroethane or perfluorocyclobutane. Rapid evaporation of plasticizing fluid causes slowly diffusing material to be trapped within the closed cells; and subsequent equilibration with air, preferably at temperatures less than or about 100° C., causes reinflation of the foam. While the specific fluorocarbons mentioned are preferred for the necessary gas-inflation, other systems are satisfactory as long as they cause reinflation to the desired low densities.

Heat-sealing is a well-known means for joining thermoplastic sheets, and apparatus for heat-sealing either incrementally or continuously is available commercially. Likewise, it is well-known to cut or score along heat-seal seams. In heat-sealing, pressure and heat are applied on a line along two or more contacting thermoplastic sheets sufficient to cause the thermoplastic materials to flow and to integrally fuse the several sheets along the line.

Representative examples of the present invention are illustrated below. All parts and percentages are by weight.

Example I

All-plastic, heat-sealable, cushioning and insulating bags were constructed by heat-sealing. The foamed sheet employed was prepared by extrusion of a foamable composition at 134–139° C. and 480 p.s.i.g. ( 33.7 kg./cm.$^2$ gage) through a circular annular endless die-slot. Passage of the extruded tube through pinch-rolls several feet downstream from the die caused gas to collect within the tube between the die and pinch-rolls, thus expanding the tube and substantially flattening the longitudinal corrugations in the tube adjacent to the extrusion die. Slit along the extrusion direction, the tube was opened up into a flat sheet.

The homogeneous foamable composition contained 45% stereo-regular polypropylene (melt flow number of about 4.0 determined according to ASTM–D1238–62T—Condition L), 49.5% trichlorofluoromethane blowing agent, and 5.5% 1,2-dichloro - 1,1,2,2 - tetrafluoroethane slowly diffusing inflatant.

Shortly after extrusion, the fully inflated sheet collapsed in thickness by buckling of cell-walls as blowing agent escaped by diffusion and decreased pressure within the cells to less than surrounding atmospheric pressure. Retention of the slowly diffusing inflatant within the closed cells, however, created an osmotic gradient for the inward permeation of air so that the foam spontaneously reinflated. The fully inflated sheet weighed about 0.454 oz./yd.$^2$ (15.4 gm./m.$^2$) at a density of about 0.012 gm./cc. Its average thickness was about 0.065 inch (1.65 mm.). Pneumatic cushioning and predominantly closed-cell content were demonstrated by firmly squeezing the sheet between two fingers. Thickness decrease by at least 50% was observed, and regain to the original thickness occurred immediately on release of compression. Physical properties for the foamed sheet in its plane (MD denotes machine or extrusion direction and XD the perpendicular transverse direction) were:

| | MD | XD |
|---|---|---|
| Tensile strength at failure. | 2.72 lb./in. (486 gm./cm.). | 0.856 lb./in. (153 gm./cm.). |
| Tongue tear | 0.169 lb. (76.7 gm.) | 0.264 lb. (120 gm.). |
| Work-to-break in tension. | 0.766 in.-lb./in.$^2$ (137 gm.-cm./cm.$^2$). | 0.272 in.-lb./in.$^2$ (48.6 gm.-cm./cm.$^2$). |
| Spencer puncture | 0.351 ft.-lb./in.$^2$ (753 gm.-cm./cm.$^2$) | |

A number of bags ranging in size from about 4 x 6 inches (10 x 15 cm.) to 12 x 12 inches (30 x 30 cm.) were fabricated using a Sealine rotary hand-held heat-sealer. Its surface temperature was about 130–135° C. as measured with a contact thermocouple. Only flat-ribbon seams were formed, but bead-seals are an obviously workable extension.

Some bags were made using only the foam sheet which was folded to form the bag bottoms and heat-sealed at spaced intervals to create side-seams. Such cushioning and/or insulating bags are useful where protection without high tear strength is required.

A 0.001 inch (0.025 mm.) thick film of high-pressure polyethylene was overlaid on a length of the foamed sheet and the two were joined to a laminate by two opposite parallel heat-seal seams along their lengthwise margins. Folded midway between these margins, with the foam sheet inside, spaced heat-seal seams were formed perpendicular to the margins to create a series of pockets. Severing this product midway along each of the heat-sealed side-seams resulted in a series of individual bags.

In similar fashion, bags were constructed from a laminate produced by heat-sealing a foam sheet between two sheets of the polyethylene film. In this case it was necessary to run the rotary heat-sealer on both sides of each seam to get a complete seal.

All of the bags of this example were waterproof, watertight, greaseproof, flexible, resilient, visually attractive, and heat-sealable after being filled.

Example II

Seven bags were formed substantially as specified above. The closed cell foam sheet was very similar, but the polyethylene films were 1.25 and 3.0 mils (0.032 and 0.076 mm.) thick in varying combinations. Both two layered (film-foam) and three layered (film-foam-film) laminates were formed by heat-sealing and the laminates were folded, and further heat-sealed to define open-topped bags. A Vertrod impulse heat sealer was used for all heat-sealing operations. It was characterized by two heated surfaces closeable along the desired seam-line. Two controls identified as "Heat" and "Dwell" had settings on a 0–10 scale. The midrange setting (5) of both controls produced completed seals in all but the thickness seams, where it was necessary to raise "Heat" to 6 and "Dwell" to 6.5. It was surprising and unexpected to find that unmodified commercially available heat-sealing apparatus can so readily seal laminates of such dissimilar materials.

The novel bags and sleeves of this invention combine superior cushioning and thermal insulating properties with the commercially desirable ability to be closed by heat-sealing. They are dustless, clean, aesthetically appealing, waterproof, watertight, and greaseproof. Additionally these envelopes are inexpensive and are lower in weight than known envelopes of equivalent cushioning or insulating properties. This combination of useful properties, not heretofore readily provided in cushioning and insulating envelopes, results in obvious utility for these novel products, such as mailing bags, packaging of polished metal parts, electronic parts, printed circuits, glassware, bottled goods, light bulbs, delicate china and other fragile items.

What is claimed is:

1. A flexible envelope having at least 2 walls, each wall of said envelope being composed of at least one layer of a closed cell, foamed, thermoplastic polymer overlaid with and joined along the edges of each open end of the envelope to at least one layer of a film of unexpanded thermoplastic polymer by a heat-seal seam, the adjacent walls of said envelope and their corresponding foamed and film layers being joined together at their edges along the whole length of said envelope by heat-seal seams and each layer of said foamed thermoplastic polymer being substantially homogeneously foamed throughout with small polyhedral-shaped cells completely enclosed within thin film-like cell-walls and gas-inflated such that each layer of foam has a density between about 0.005 and 0.5 gm./cc.

2. The envelope of claim 1 wherein said foam has a density from about 0.005 gm./cc. to about 0.03 gm./cc.

3. The envelope of claim 1 wherein both surfaces of said layer of a closed cell, foamed thermoplastic polymer is overlaid with and joined along the edges of each open end of the envelope to one layer of a film of unexpanded thermoplastic polymer by a heat-seal seam.

4. A flexible bag having at least 2 walls, each wall of said bag being composed of at least one layer of a closed cell, foamed thermoplastic polymer overlaid with and joined along the edges of the open end of said bag to at least one layer of a film of unexpanded thermoplastic polymer, by a heat-seal seam, the adjacent walls of said bag and their corresponding foamed and film layers are joined together at their edges along the whole length of said bag by heat-seal seams and each layer of said foamed thermoplastic polymer being substantially homogeneously foamed throughout with small polyhedral-shaped cells completely enclosed within thin film-like cell-walls and gas-inflated such that each layer of foam has a density between about 0.005 and 0.5 gm./cc.

5. The bag of claim 4 wherein said foam has a density from about 0.005 gm./cc. to about 0.03 gm./cc.

6. The bag of claim 4 wherein both surfaces of said layer of a closed cell, foamed, thermoplastic polymer is overlaid with and joined along the edges of each open end of the bag to one layer of a film of unexpanded thermoplastic polymer by a heat-seal seam.

7. A flexible bag having at least 2 walls, each wall of said bag being composed of at least one layer of a closed cell, foamed thermoplastic polymer, the adjacent walls of said bag being joined together at their edges along the whole length of said bag by heat-seal seams and each layer of said foamed thermoplastic polymer being substantially homogeneously foamed throughout with small polyhedral-shaped cells completely enclosed within thin film-like cell-walls and gas-inflated such that each layer of foam has a density between about 0.005 and 0.5 gm./cc.

8. The bag of claim 7 wherein the foam has a density from about 0.005 gm./cc. to about 0.03 gm./cc.

9. A flexible bag having at least two walls, each wall of said bag being composed of at least one layer of a closed cell foamed thermoplastic polymer, said polymer consisting essentially of and selected from the group consisting of linear high-density polyethylene and stereoregular polypropylene, the adjacent walls of said bag being joined together at their edges along the whole length of said bag by heat-seal seams and each layer of said foamed thermoplastic polymer being substantially homogeneously foamed throughout with small polyhedral-shaped cells completely enclosed within thin film-like cell-walls and gas-inflated such that each layer of foam has a density between about 0.005 and 0.5 gm./cc.

References Cited

UNITED STATES PATENTS

| 2,904,814 | 9/1959 | Scholl | 156—251 X |
| 2,917,217 | 12/1959 | Sisson | 229—4.5 |
| 3,240,855 | 3/1966 | Voelker | 264—321 |
| 3,194,124 | 7/1965 | Warp | 229—69 X |
| 3,354,020 | 11/1967 | Copeland. | |

FOREIGN PATENTS 937,956  9/1963  Great Britain.

DAVID M. BOCKENEK, Primary Examiner

U.S. Cl. X.R.

229—3, 69; 264—53